(12) United States Patent
Wada et al.

(10) Patent No.: US 10,741,807 B2
(45) Date of Patent: Aug. 11, 2020

(54) HEATER MODULE

(71) Applicant: HONDA MOTOR CO., LTD., Tokyo (JP)

(72) Inventors: Shinji Wada, Saitama (JP); Masanori Matsuda, Saitama (JP); Yoshikazu Kenmoku, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 350 days.

(21) Appl. No.: 15/792,918

(22) Filed: Oct. 25, 2017

(65) Prior Publication Data

US 2018/0114962 A1   Apr. 26, 2018

(30) Foreign Application Priority Data

Oct. 29, 2016   (JP) ................. 2016-209793

(51) Int. Cl.
| | |
|---|---|
| *H01M 2/10* | (2006.01) |
| *H01M 10/6554* | (2014.01) |
| *H01M 10/615* | (2014.01) |
| *H01M 10/625* | (2014.01) |
| *H01M 10/64* | (2014.01) |

(Continued)

(52) U.S. Cl.
CPC ....... *H01M 2/1083* (2013.01); *H01M 10/615* (2015.04); *H01M 10/625* (2015.04); *H01M 10/64* (2015.04); *H01M 10/6554* (2015.04); *H01M 2/206* (2013.01);

(Continued)

(58) Field of Classification Search
CPC .. H01M 2/1083; H01M 2/206; H01M 2/0777; H01M 2/1077; H01M 2/20; H01M 10/615; H01M 10/625; H01M 10/64; H01M 10/6554; H01M 10/6555; H01M 10/657; H01M 10/5081; H01M 10/5006; H01M 10/5051; H01M 10/486; H01M 10/5083; H01M 10/5016; H01M 10/65712; H01M 2200/00; H05B 3/26; H05B 3/22; H05B 3/06

See application file for complete search history.

(56) References Cited

U.S. PATENT DOCUMENTS

| | | | |
|---|---|---|---|
| 9,252,408 B2* | 2/2016 | Kinoshita | ........... H01M 2/1077 |
| 2008/0179315 A1 | 7/2008 | Suzuki et al. | |
| 2013/0161310 A1 | 6/2013 | Kinoshita et al. | |

FOREIGN PATENT DOCUMENTS

| | | |
|---|---|---|
| JP | 2008-186621 A | 8/2008 |
| JP | 2012-190690 A | 10/2012 |

* cited by examiner

*Primary Examiner* — Shawntina T Fuqua
(74) *Attorney, Agent, or Firm* — Paratus Law Group, PLLC (57) ABSTRACT

A heater module is configured to be arranged on a side surface of a battery module and includes: a heat equalizing plate; a heater, a heater cover; and a metal stay in this order from the side surface of the battery module. The heater is fixed on the heat equalizing plate, the heater cover includes a heat equalizing plate holding portion and a stay holding portion, the metal stay includes: fastening portions provided on both end portions thereof in a stacking direction of cells and configured to be fastened to the side surface of the battery module; and a bent portion configured to cover a lower surface of the heater cover, and the bent portion of the metal stay is arranged at a location overlapping with the heat equalizing plate holding portion of the heater cover in the stacking direction.

8 Claims, 10 Drawing Sheets

(51) Int. Cl.
*H01M 10/6555* (2014.01)
*H01M 10/657* (2014.01)
*H01M 2/20* (2006.01)

(52) U.S. Cl.
CPC ...... *H01M 10/657* (2015.04); *H01M 10/6555* (2015.04); *H01M 2200/00* (2013.01)

HEATER MODULE

CROSS-REFERENCE TO RELATED APPLICATION(S)

This application claims priority from Japanese Patent Application No. 2016-209793 filed on Oct. 26, 2016, the entire contents of which are incorporated herein by reference.

FIELD

The present invention relates to a heater module arranged on a side surface of a battery module.

BACKGROUND

Heater modules for warming a battery module mounted on an electric vehicle and the like are known. For example, a heater module arranged to oppose a side surface of a battery module is disclosed in JPA-2012-190690, and a heater module fixed on a lower surface of a battery module is disclosed in JPA-2008-186621.

The heater module disclosed in JPA-2012-190690 is arranged to oppose the side surface of the battery module, but is a separate body from the battery module. Therefore, there is a problem that it takes time in installing the heater unit on a vehicle or the like.

The heater module disclosed in JPA-2008-186621 can be handled integrally with the battery module and thus can be easily installed on a vehicle or the like. However, since the heater module is fixed on the lower surface of the battery module, the hearer module is not suitable for installation in a space, of which height dimension is limited.

When a heater module is fixed on a side surface of a battery module so that the heater module can be handled integrally with the battery module, it is conceived that the heater module constituted of a heat equalizing plate, a heater and a heater cover is fastened to the side surface of the battery module via a metal stay. However, in order to prevent the heat equalizing plate, on which the heater having a relatively heavy weight is attached, from falling out, a rigidity of the heater cover needs to be increased. On the other hand, if a thickness of the heater cover is increased for the purpose of increasing the rigidity of the heater cover, then an increase in size, weight and manufacturing cost is caused.

SUMMARY

The present invention is to provide a heater module which can suppress an increase in thickness of a heater cover and also can prevent falling-out of a heat equalizing plate.

The invention provides following aspects (1) to (8).

(1) A heater module (e.g., a heater module 1 in embodiment) which is configured to be arranged on a side surface of a battery module (e.g., a battery module 101 in embodiment), the battery module being constructed by stacking a plurality of cells (e.g., cells 121 in embodiment), and which includes:

a heat equalizing plate (e.g., a heat equalizing plate 2 in embodiment);

a heater (e.g., a heater 3 in embodiment);

a heater cover (e.g., a heater cover 4 in embodiment); and a metal stay (e.g., a metal stay 5 in embodiment), the heat equalizing plate, the heater, the heater cover, and the metal stay being arranged in this order from the side surface of the battery module, wherein the heater is fixed on the heat equalizing plate, wherein the heater cover includes a heat equalizing plate holding portion (e.g., heat equalizing plate holding portions 42A in embodiment) for holding the heat equalizing plate and a stay holding portion (e.g., stay holding portions 45 in embodiment) for holding the metal stay, wherein the metal stay includes: fastening portions (e.g., fastening portions 52 in embodiment) provided on both end portions thereof in a stacking direction of the cells and configured to be fastened to the side surface of the battery module; and a bent portion (e.g., bent portions 53 in embodiment) configured to cover a lower surface of the heater cover, and wherein the bent portion of the metal stay is arranged at a location overlapping with the heat equalizing plate holding portion of the heater cover in the stacking direction.

(2). The heater module according to (1), wherein the metal stay is configured so that the fastening portions are respectively connected to a stay main body (e.g., a stay main body 51 in embodiment) via crank portions (e.g., crank portions 55 in embodiment).

(3). The heater module according to (1) or (2), wherein the heater cover includes an abutting portion (e.g., abutting portions 47 in embodiment) configured to abut against the side surface of the battery module so that an air layer (e.g., an air layer S in embodiment) is formed between the heat equalizing plate and the side surface, and wherein a plurality of the abutting portions are formed in the stacking direction.

(4). The heater module according to any one of (1) to (3), wherein the heat equalizing plate holding portion of the heater cover allows the heat equalizing plate to move in the stacking direction.

(5). The heater module according to any one of (1) to (4), wherein the heater cover and the heat equalizing plate are positioned by a first rivet (e.g., a first rivet 6 in embodiment), and wherein the metal stay and the heater cover are positioned by a second rivet (e.g., a second rivet 7 in embodiment).

(6). The heater module according to (5), wherein the first rivet and the second rivet are disposed substantially at a middle portion of the battery module in the stacking direction.

(7). The heater module according to any one of (1) to (6), wherein the heater cover has a through-hole (e.g., tying band insertion holes 49A, 49B in embodiment) through which a tying band (e.g., tying bands 9 in embodiment) is inserted.

(8). The heater module according to (7), wherein the through-hole is provided on each of both end portions of the heater cover in the stacking direction.

According to (1), the bent portion of the metal stay keeps the heat equalizing plate holding portion of the heater cover from below. Therefore, it is possible to increase a rigidity of the peripheral of the heat equalizing plate holding portion without increasing a thickness of the heater cover, thereby preventing falling-out of the heat equalizing plate.

According to (2), the fastening portions of the metal stay are respectively connected to the stay main body via the crank portions. Therefore, even if the fastening portions are moved along with expansion of the battery module in the cell stacking direction, it is possible to absorb movement of the fastening portions by deformation of the crank portions.

According to (3), the heater cover has the abutting portion configured to abut against the side surface of the battery module so that the air layer is formed between the heat equalizing plate and the side surface of the battery module, and a plurality of the abutting portions are formed in the cell stacking direction. Therefore, since the air layer is ensured even if the battery module is expanded, it is possible to prevent occurrence of abnormal noise or electrolytic corrosion due to contact between the heat equalizing plate and the battery module.

According to (4), since the heat equalizing plate holding portion of the heater cover allows the heat equalizing plate to move in the cell stacking direction, it is possible to slidingly insert the heat equalizing plate into the heater cover and also to absorb thermal expansion of the heat equalizing plate.

According to (5), the heater cover and the heat equalizing plate are positioned by the first rivet, and the metal stay and the heater cover are positioned by the second rivet. Therefore, it is possible to restrict relative positions of the three members by the two rivets.

According to (6), since the first rivet and the second rivet are disposed substantially at the middle portion of the battery module in the cell stacking direction, it is possible to restrict the relative positions of the three members at a location where even if the battery module is expanded, an influence thereof on the metal stay is smallest.

According to (7), since the heater cover has the through-hole through which the tying band is inserted, it is possible to properly arrange a harness of the heater.

According to (8), since the through-hole is provided on each of both end portions of the heater cover in the cell stacking direction, it is possible to draw out the harness of the heater from either side of the heater module, thereby enhancing a degree of freedom of layout of the harness.

BRIEF DESCRIPTION OF DRAWINGS

FIGS. 4A to 4E are sectional views of the heater module and the battery module according to the embodiment of the present invention, in which

DETAILED DESCRIPTION

Hereinafter, one embodiment of a heater module according to the present invention will be described with reference to the accompanying drawings. Meanwhile, it will be noted that the drawing are viewed in a direction of reference numerals.

Figure 1:
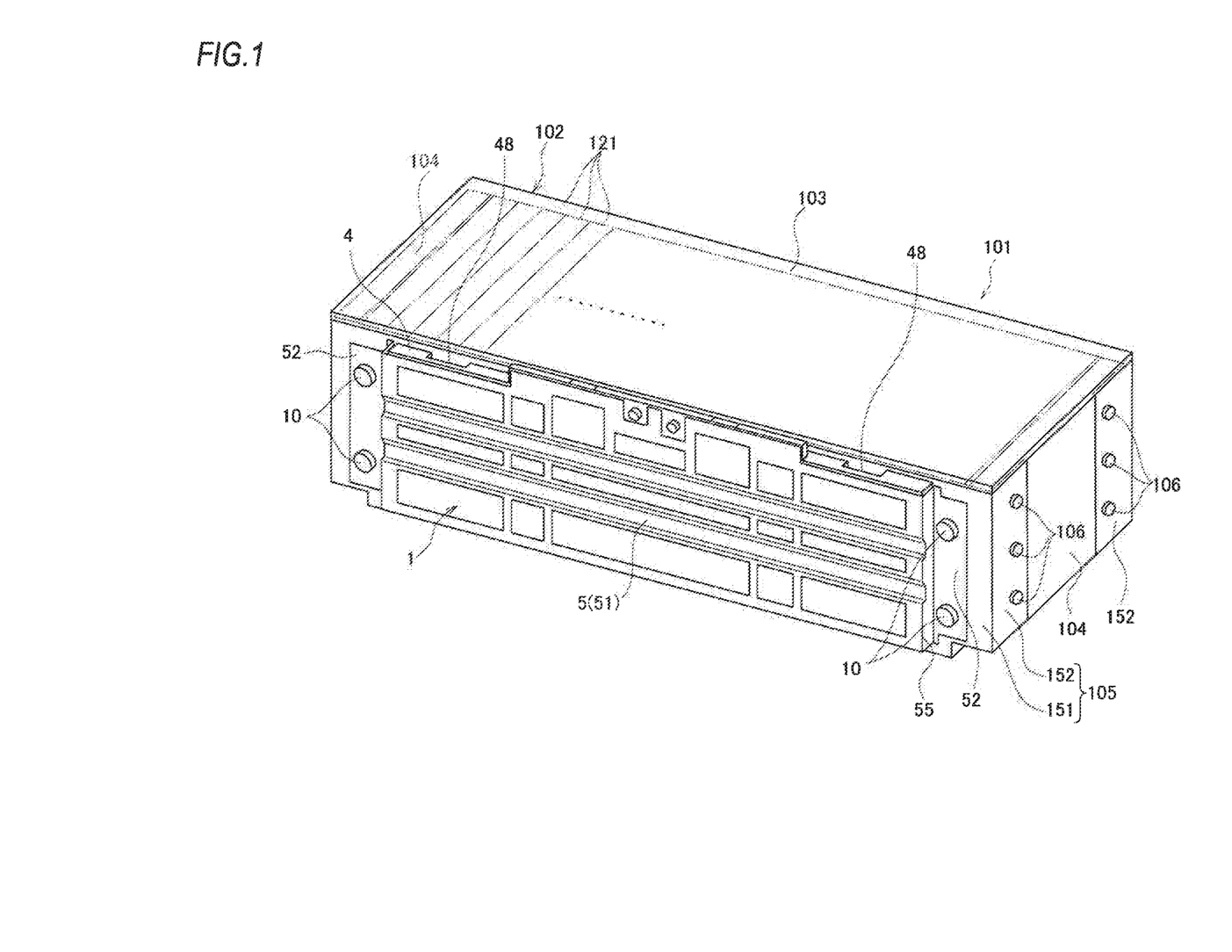
FIG. 1 is a schematic perspective view showing a heater module and a battery module according to one embodiment of the present invention.

As shown in FIG. 1, a heater module 1 according to one embodiment of the present invention is intended to warm a battery module 101 mounted on an electric vehicle, such as a hybrid vehicle or an electric automobile, and is configured to be arranged on one side surface of the battery module 101.

[Battery Module]

As shown in FIG. 1, the battery module 101 includes a cell stack 102, a top cover 103, end plates 104 and side plates 105.

The cell stack 102 is constructed by stacking a plurality of cells 121. The cell stack 102 is subjected to change in shape thereof due to expansion of the cells 121 by temperature changes or aging. In particular, in the stacking direction of the cells 121, expansion amounts of the plurality of cells 121 are accumulated, and as a result, a large shape change is likely to occur.

A bus bar (not shown) for electrically connecting the plurality of cells 121 or the top cover 103 for covering the bus bar and the like from above is arranged on an upper surface of the cell stack 102. Also, the end plates 104 are respectively arranged on both end surfaces of the cell stack 102 in the cell stacking direction, and the side plates 105 are respectively arranged on both side surfaces of the cell stack 102 along the cell stacking direction.

Each side plate 105 is constructed of a metallic plate material and has a side plate main body 151 for supporting a side surface of the cell stack 102 extending along the cell stacking direction, and fixing pieces 152 respectively extending from both ends, in the cell stacking direction, of the side plate main body 151 toward outer surfaces of the end plates 104. The fixing pieces 152 are fastened to the end plates 104 via a plurality of bolts 106.

The side plates 105 allows the end plates 104 to move in the cell stacking direction along with expansion and deformation of the cell stack 102. At that time, the side plates 105 are also deformed, and thus when the heater module 1 is fixed on the side surface of the battery module 101, expansion of the battery module 101 has to be considered.

[Heater Module]

Figure 6:
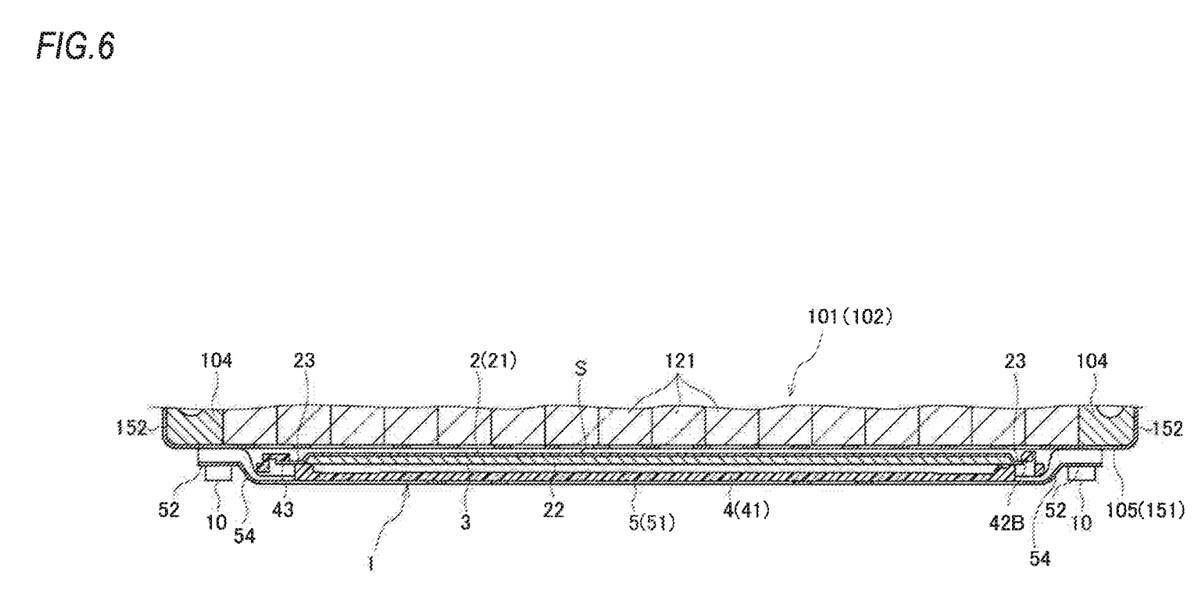
FIG. 6 is a sectional view taken along a line F-F in FIG. 2.

As shown in FIG. 6, the heater module 1 includes a heat equalizing plate 2, a heater 3, a heater cover 4 and a metal stay 5, which are arranged in this order from the side surface of the battery module 101.

The heater 3 has a thin plate shape. In the present embodiment, a PTC heater having a positive temperature coefficient (PTC) characteristic is used as the heater 3, but a heating manner in the heater 3 is not limited thereto.

The heat equalizing plate 2 is constructed of a metallic plate material having a high heat conductivity and has a heat equalizing plate main body 21 opposing the side surface of the battery module 101 with an air layer S interposed therebetween, a receiving recess portion 22 arranged on a back surface side of the heat equalizing plate main body 21 and configured to receive the heater 3 therein, and a flange portion 23 extending from a peripheral edge portion of the receiving recess portion 22 in the vertical direction and also the cell stacking direction. The air layer S formed between the heat equalizing plate 2 and the battery module 101 is not only important for equalizing a heat generated by the heater 3, but also required for preventing occurrence of abnormal noise or electrolytic corrosion due to contact between the heat equalizing plate 2 and the battery module 101.

Figure 2:
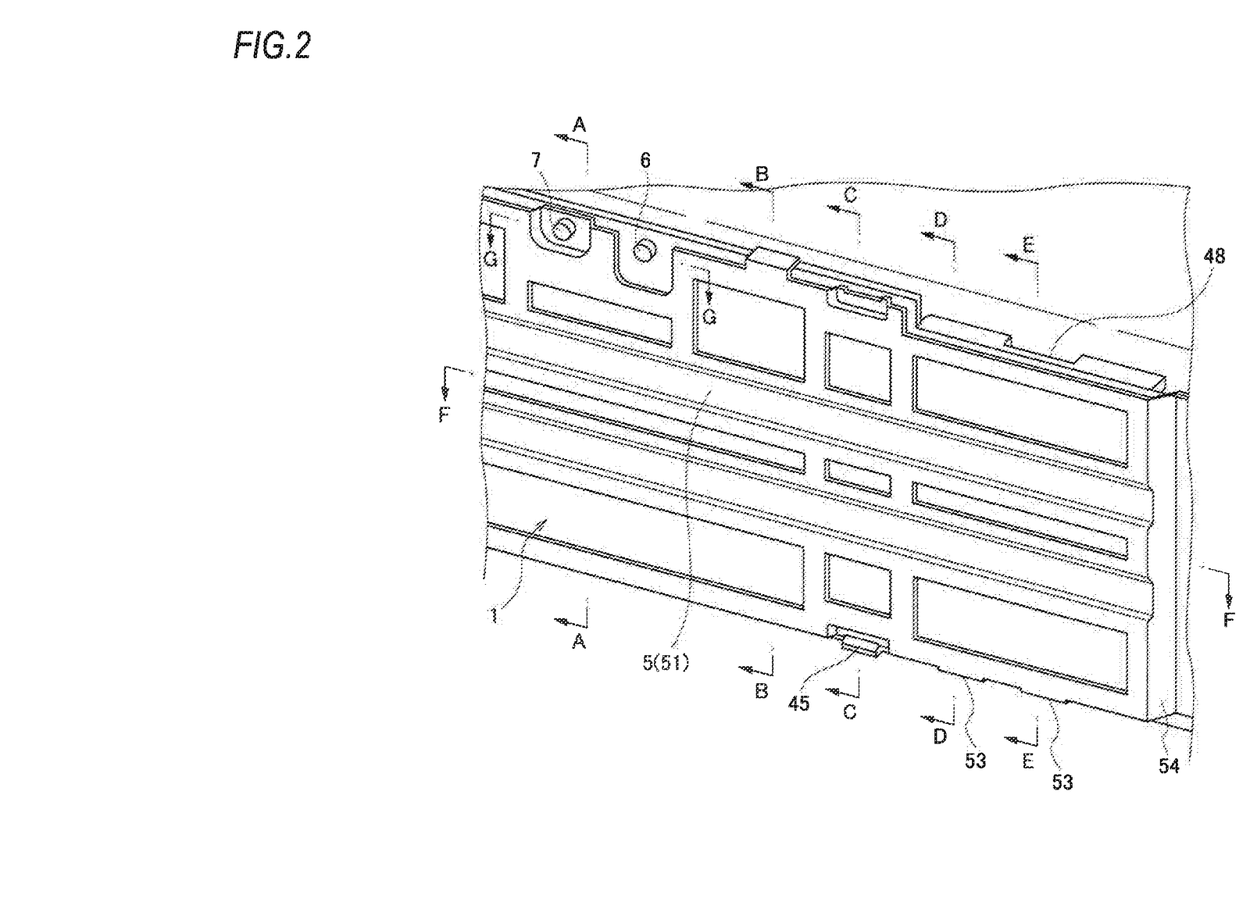
FIG. 2 is a perspective view showing a main part of the heater module and the battery module according to the embodiment of the present invention.
Figure 3:
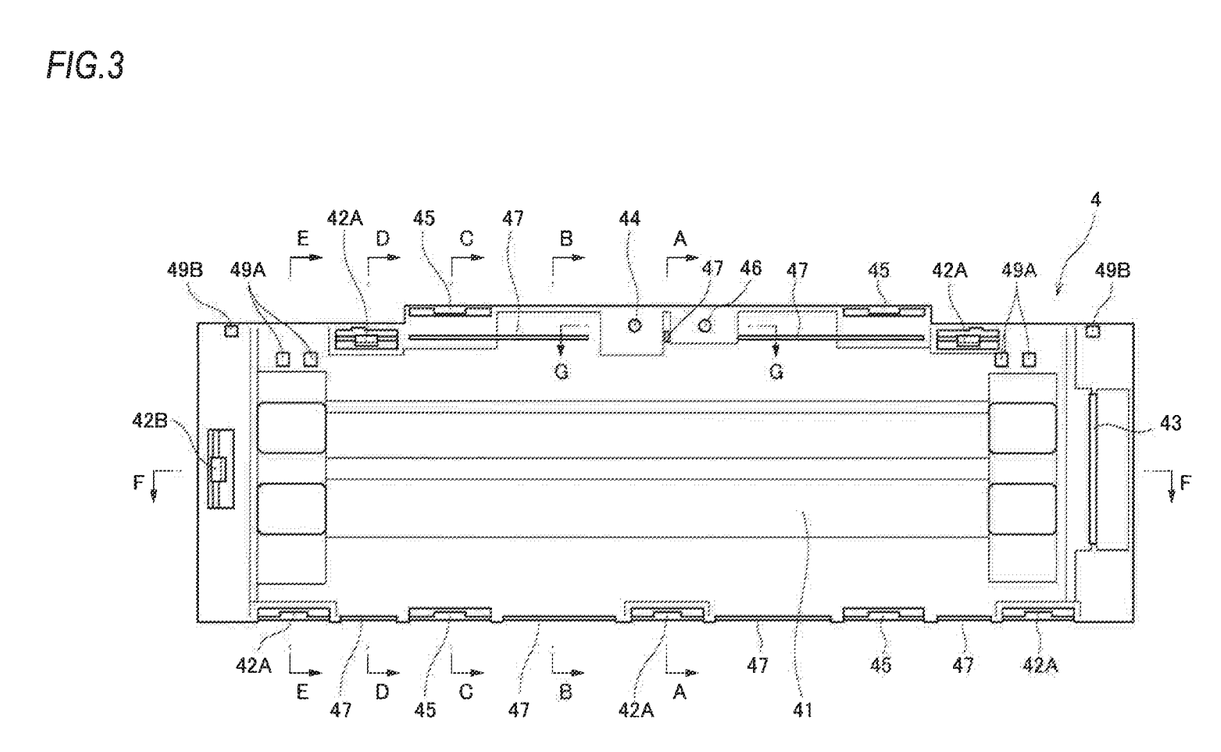
FIG. 3 is a front view showing a heater cover of the heart module (a face thereof opposite to the battery module) according to the embodiment of the present invention.

The heater cover 4 is constructed of a plate-shaped resin member, and as shown in FIG. 3, has not only a heater cover main body 41 covering an outer surface side of the heater 3 received in the receiving recess portion 22 of the heat equalizing plate 2, but also heat equalizing plate holding portions 42A, 42B, a heat equalizing plate insertion portion 43, a first positioning hole 44, stay holding portions 45, a second positioning hole 46, abutting portions 47, harness drawing-out portions 48 (see FIGS. 1 and 2) and tying band insertion holes 49A, 49B.

The heat equalizing plate holding portions 42A, 42B are intended to hold the flange portion 23 of the heat equalizing plate 2 and include a plurality of heat equalizing plate holding portions 42A formed side by side in the cell stacking direction on upper and lower end portions of the heater cover 4 and a heat equalizing plate holding portion 42B formed on one end portion of the heater cover 4 in the cell stacking direction. The heat equalizing plate holding portions 42A, 42B of the present embodiment have a snap fit structure that holds the flange portion 23 of the heat equalizing plate 2 in a locked state using elasticity of locking claws integrally formed on the heater cover 4. The heat equalizing plate holding portions 42A having such a snap fit structure allows movement (sliding) of the heat equalizing plate 2 in the cell stacking direction during assembly thereof, while locking the flange portion 23 of the heat equalizing plate 2 (restricting falling-out thereof in the vertical direction and also toward the battery module 101).

As shown in FIG. 6, the heat equalizing plate insertion portion 43 is formed on the other end portion of the heater cover 4 in the cell stacking direction and is configured to allow the flange portion 23 of the heat equalizing plate 2 to be inserted therein in the cell stacking direction. That is, one end side of the heat equalizing plate 2 in the cell stacking direction is held by the heat equalizing plate holding portion 42B formed on the one end portion of the heater cover 4 in the cell stacking direction, and the other end side of the heat equalizing plate 2 in the cell stacking direction is held by the heat equalizing plate insertion portion 43 formed on the other end portion of the heater cover 4 in the cell stacking direction.

A region required for inserting the heat equalizing plate 2 into the heat equalizing plate insertion portion 43 is ensured to have a clearance greater than that of a region required for engaging the heat equalizing plate 2 to be inserted therein. That is, when the heat equalizing plate 2 is attached on the heater cover 4, the other end side of the heat equalizing plate 2 in the cell stacking direction is deeply inserted into the heat equalizing plate insertion portion 43, and then after locking the upper and lower end portions of the heat equalizing plate 2 on the heat equalizing plate holding portions 42A, the heat equalizing plate 2 is slid toward one end side in the cell stacking direction, so that the one end side of the heat equalizing plate 2 is locked on the heat equalizing plate holding portion 42B.

Figure 7:
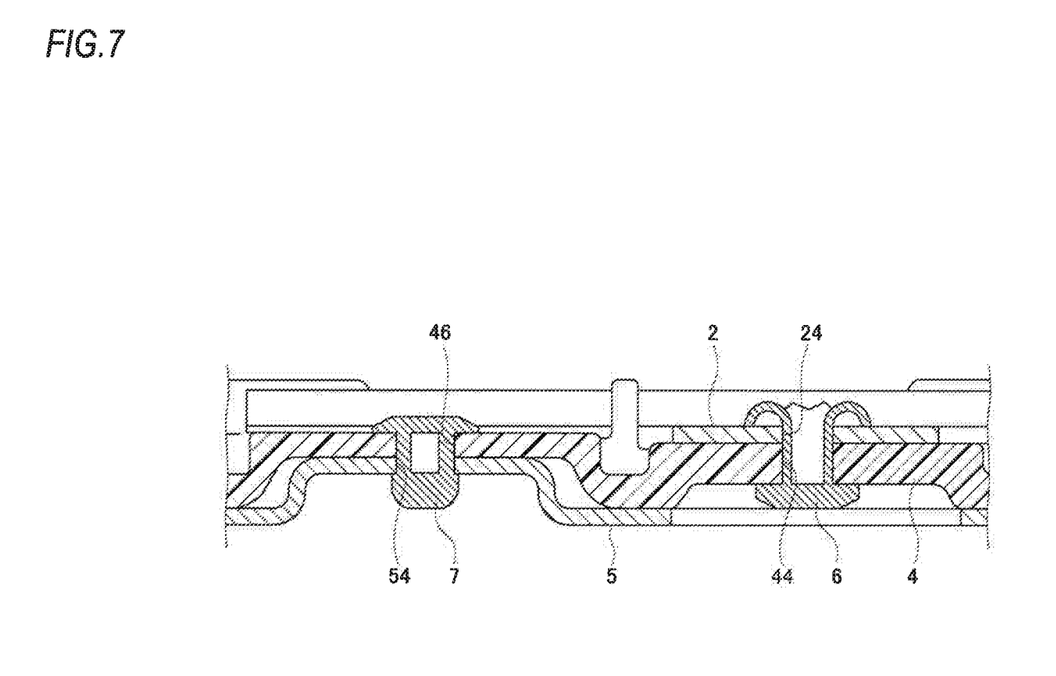
FIG. 7 is a sectional view taken along a line G-G in FIG. 2.

As shown in FIGS. 3 and 7, the first positioning hole 44 is intended to restrict a relative position between the heat equalizing plate 2 and the heater cover 4. The relative position between the heat equalizing plate 2 and the heater cover 4 is restricted by aligning the first positioning hole 44 formed in the heater cover 4 with a positioning hole 24 formed in the heat equalizing plate 2 and then inserting a first rivet 6 through the first positioning hole 44 and the positioning hole 24.

The first rivet 6 is positioned substantially at the middle portion of the battery module 101 in the cell stacking direction. By doing so, when the metal stay 5 is fastened to both end portions of the battery module 101 in the cell stacking direction, it is possible to restrict the relative position between the heat equalizing plate 2 and the heater cover 4 at a location, which is farthest from fastening locations of the metal stay 5 with respect to the battery module 101 and thus at which an influence of expansion of the battery module 101 is smallest.

Figure 8:
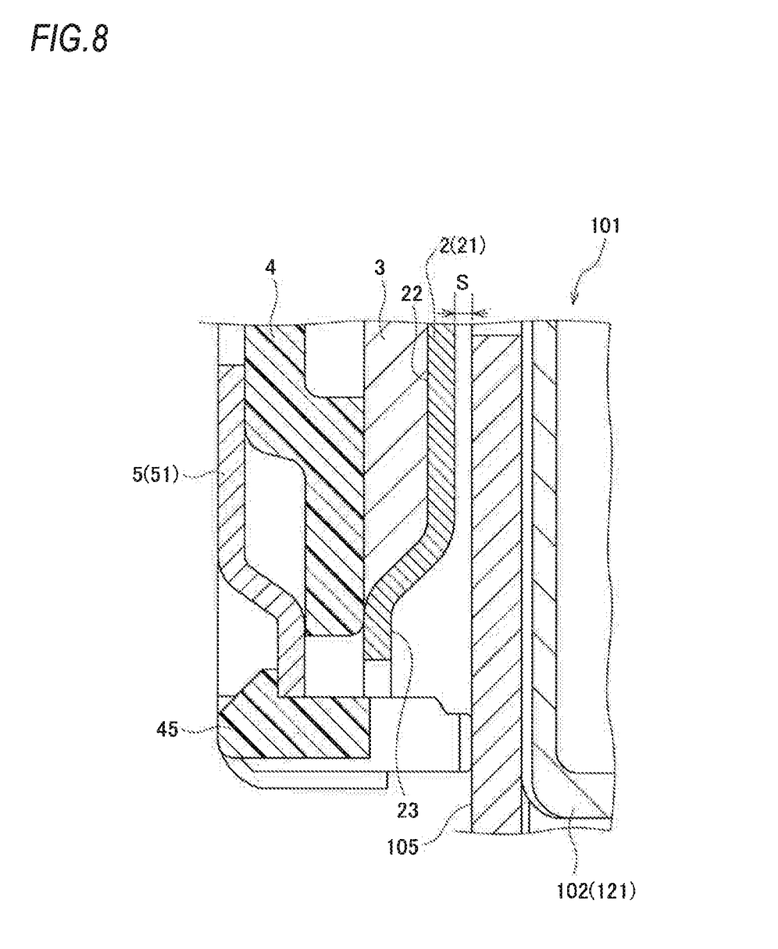
FIG. 8 is an enlarged sectional view of the lower part taken along the line C-C in FIG. 2.

As shown in FIG. 3, a plurality of stay holding portions 45, which are intended to hold upper and lower end portions of the metal stay 5, are formed side by side in the cell stacking direction on the upper and lower end portions of the heater cover 4. As shown in FIG. 8, the stay holding portions 45 of the present embodiment have a snap fit structure that holds the upper and lower end portions of the metal stay 5 in a locked state using elasticity of locking claws integrally formed on the heater cover 4.

As shown in FIGS. 3 and 7, the second positioning hole 46 is intended to restrict a relative position between the heater cover 4 and the metal stay 5. The relative position between the heater cover 4 and the metal stay 5 is restricted by aligning the second positioning hole 46 formed in the heater cover 4 with a positioning hole 54 formed in the metal stay 5 and then inserting a second rivet 7 through the second positioning hole 46 and the positioning hole 54.

The second rivet 7 is positioned substantially at the middle portion of the battery module 101 in the cell stacking direction. By doing so, when the metal stay 5 is fastened to both end portions of the battery module 101 in the cell stacking direction, it is possible to restrict the relative position between the heater cover 4 and the metal stay 5 at a location, which is farthest from fastening locations of the metal stay 5 with respect to the battery module 101 and thus at which an influence of expansion of the battery module 101 is smallest.

Figure 9:
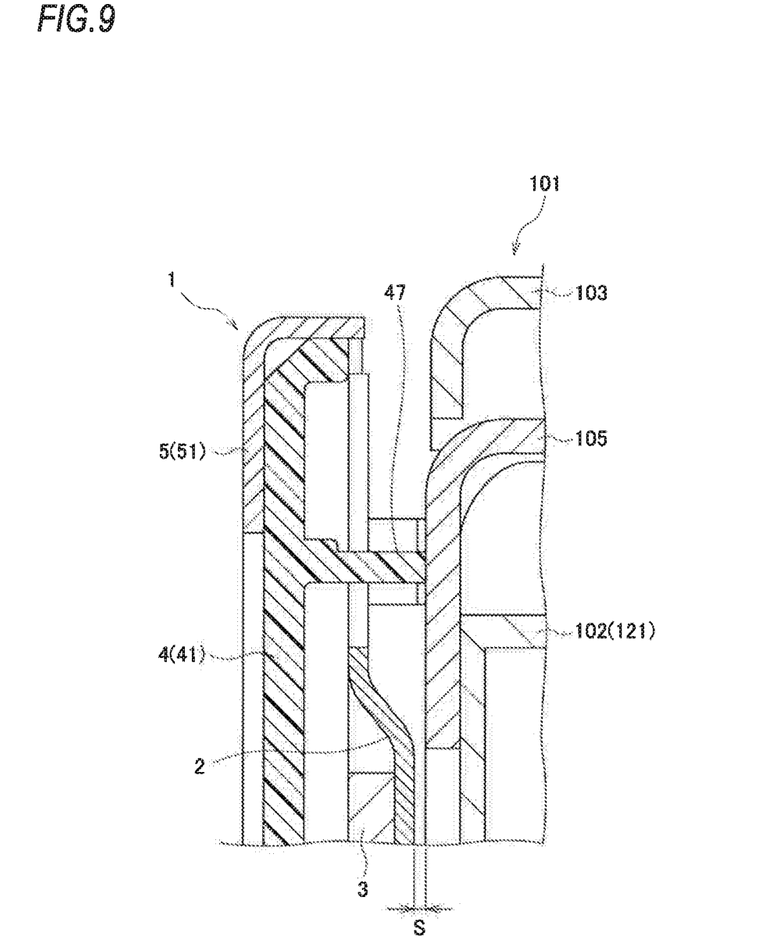
FIG. 9 is an enlarged sectional view of the upper part taken along the line B-B in FIG. 2.

As shown in FIG. 9, the abutting portions 47 are a protrusion provided to protrude from a surface of the heater cover 4 facing the battery module 101 and is configured to abut against the side surface of the battery module 101, thereby forming the air layer S between the heat equalizing plate 2 and the side surface of the battery module 101. As shown in FIG. 3, a plurality of abutting portions 47 are formed side by side in the cell stacking direction on the upper and lower end portions of the heater cover 4, so that the air layer S is formed over the entire area of the heat equalizing plate 2 in the cell stacking direction.

Figure 10:
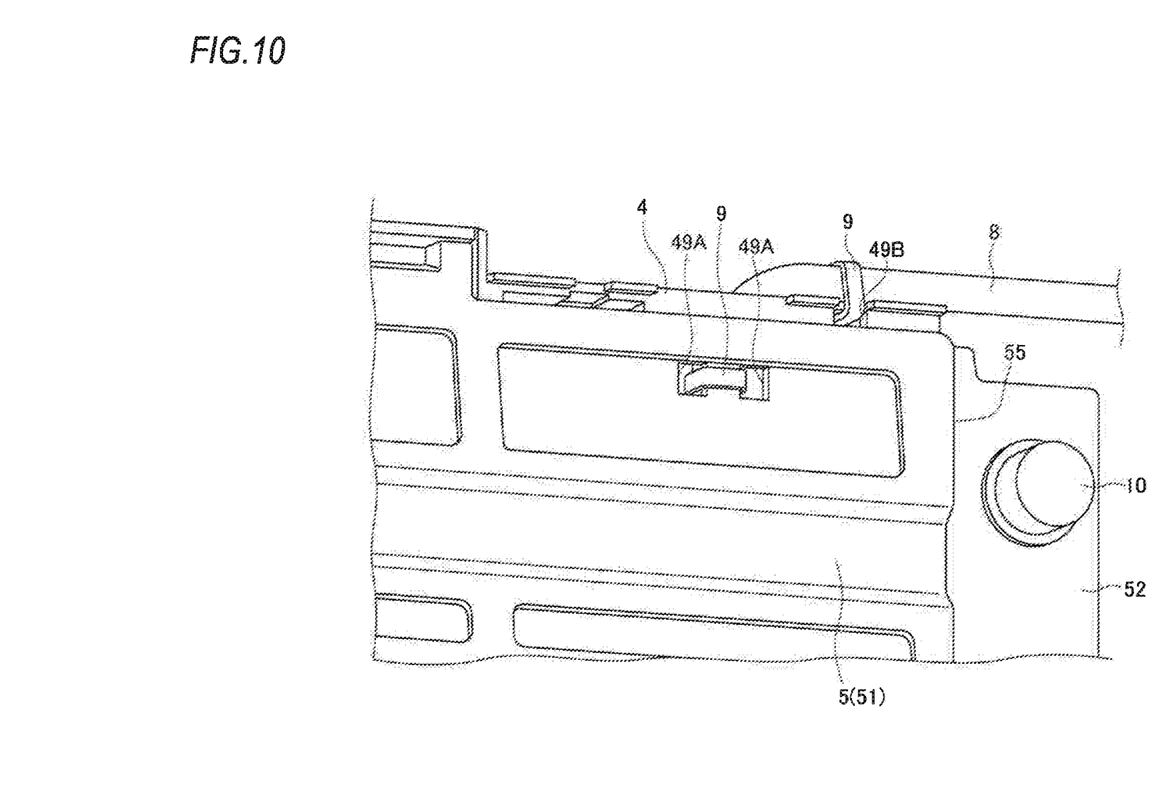
FIG. 10 is a perspective view of a main part showing a tied state of a harness of the heater module.

The harness drawing-out portion 48 (see FIGS. 1 and 2) is an opening for drawing out a harness 8 of the heater 3 from the upper end portion of the heater cover 4 and is provided with the tying band insertion holes 49A, 49B in the vicinity thereof. As shown in FIG. 10, the tying band insertion holes 49A, 49B are through-holes configured to allow tying bands 9 for tying the harness 8 onto the heater cover 4 to be inserted therethrough. By tying the harness 8 onto the heater cover 4 using the tying band insertion holes 49A, 49B provided at predetermined locations, the harness 8 is properly arranged in a predetermined layout (in the present embodiment, a L-shaped layout in which the harness 8 is drawn out vertically upward from the heater cover 4 and then arranged along the upper end of the heater cover 4).

The harness drawing-out portion 48 and the tying band insertion holes 49A, 49B are provided on each of both end portions of the heater cover 4 in the cell stacking direction. Therefore, the harness 8 of the heater 3 can be drawn out from either side of the heater module 1 in the cell stacking direction, thereby allowing a drawing location of the harness 8 to be selectively changed corresponding to arrangement of the battery module 101 or the heater module 1.

As shown in FIGS. 1 and 2, the metal stay 5 is constructed of a metallic plate material and has a stay main body 51, fastening portions 52, bent portions 53 and crank portions 55.

The stay main body 51 is configured to cover the outer surface side of the heater cover 4 and to be held by the stay holding portions 45 of the heater cover 4.

The fastening portions 52 are configured to extend from both end portions of the stay main body 51 in the cell stacking direction and to be fastened to the side surface of the battery module 101 via bolts 10. The fastening portions 52 are respectively connected to the stay main body 51 via the crank portions 55, which are bent in a crank shape. Thus, even if the fastening portions 52 are moved along with expansion of the battery module 101 in the cell stacking direction, movement thereof is absorbed by deformation of the crank portions 55.

Figure 4A:
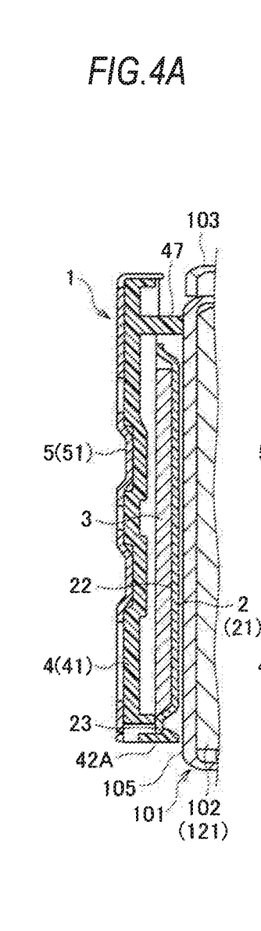
FIG. 4A is a sectional view taken along a line A-A in FIGS. 2 and 3.
Figure 4B:
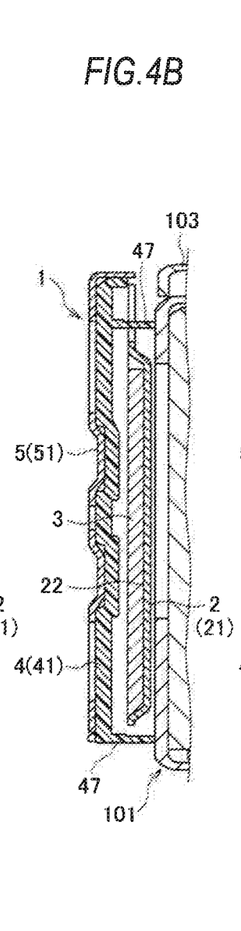
FIG. 4B is a sectional view taken along a line B-B in FIGS. 2 and 3.
Figure 4C:
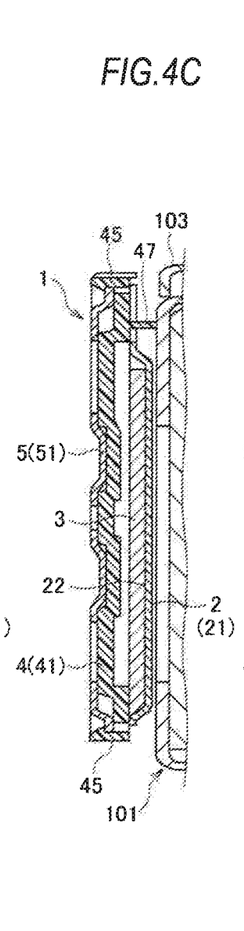
FIG. 4C is a sectional view taken along a line C-C in FIGS. 2 and 3.
Figure 4D:
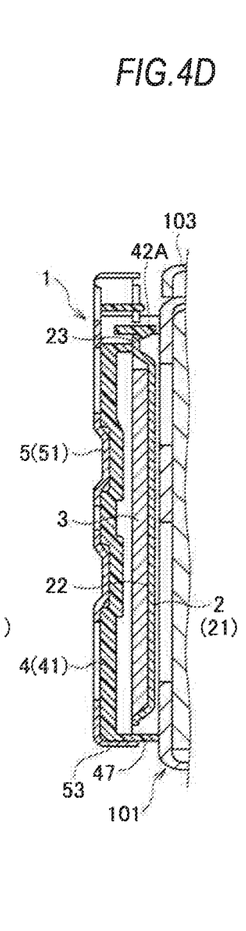
FIG. 4D is a sectional view taken along a line D-D in FIGS. 2 and 3 and FIG. 4E is a sectional view taken along a line E-E in FIGS. 2 and 3.
Figure 4E:
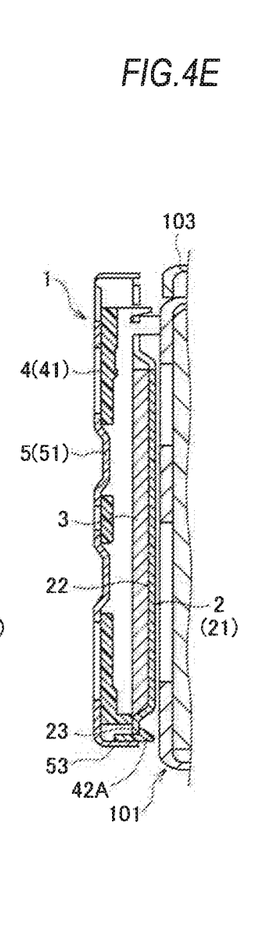
Figure 5:
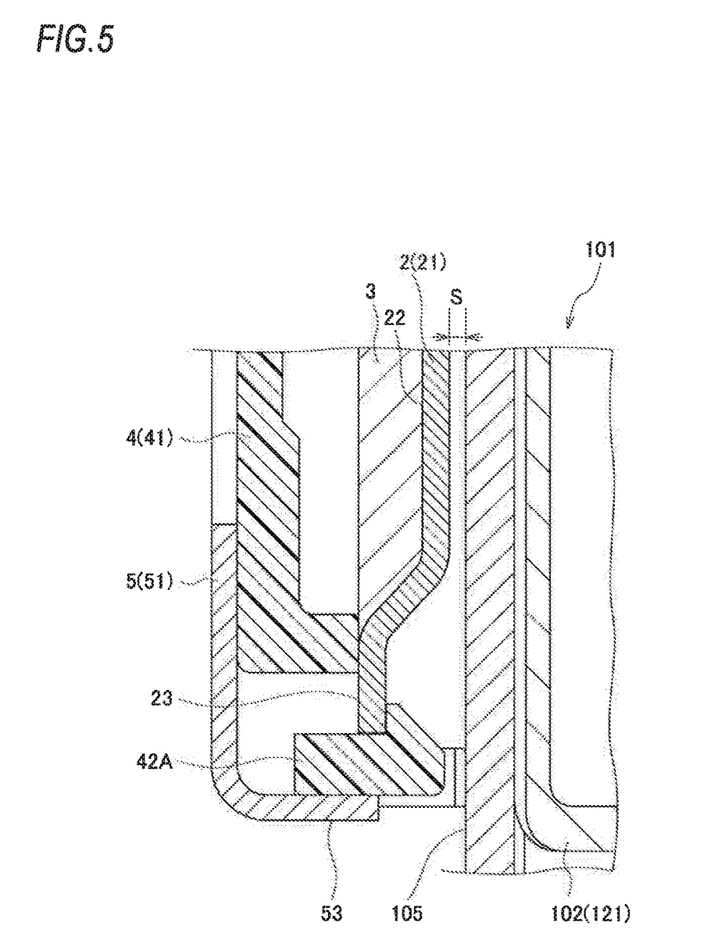
FIG. 5 is an enlarged sectional view of a lower part taken along a line E-E in FIG. 2.

The bent portions 53 are configured to be bent from the lower end portion of the stay main body 51 and thus to extend along a lower surface of the heater cover 4, thereby covering the lower surface of the heater cover 4. As shown in FIG. 4E, the bent portions 53 are arranged at locations overlapping in the cell stacking direction with the heat equalizing plate holding portions 42A provided on the lower end portion of the heater cover 4 and the bent portions 53 are configured to restrict the locking claws, which constitutes the heat equalizing plate holding portions 42A, from being elastically deformed downward. Therefore, a rigidity of the peripherals of the heat equalizing plate holding portions 42A is increased and falling-out of the heat equalizing plate 2 is prevented. Alternatively, in addition to the locations overlapping with the heat equalizing plate holding portions 42A in the cell stacking direction, the bent portions 53 may be provided at other parts as shown in FIG. 4D.

As described above, according to the heater module 1 of the present embodiment, the bent portions 53 of the metal stay 5 keep the heat equalizing plate holding portions 42A of the heater cover 4 from below. Therefore, it is possible to increase a rigidity of the peripherals of the heat equalizing plate holding portions 42A without increasing a thickness of the heater cover 4, thereby preventing falling-out of the heat equalizing plate 2.

Also, the fastening portions 52 of the metal stay 5 are respectively connected to the stay main body 51 via the crank portions 55. Therefore, even if the fastening portions 52 are moved along with expansion of the battery module 101 in the cell stacking direction, it is possible to absorb movement of the fastening portions 52 by deformation of the crank portions 55.

Further, the heater cover 4 has the abutting portion 47 configured to abut against the side surface of the battery module 101 so that the air layer S is formed between the heat equalizing plate 2 and the side surface of the battery module 101, and a plurality of the abutting portions 47 are formed in the cell stacking direction. Therefore, since the air layer S is ensured even if the battery module 101 is expanded, it is possible to prevent occurrence of abnormal noise or electrolytic corrosion due to contact between the heat equalizing plate 2 and the battery module 101.

Further, since the heat equalizing plate holding portions 42A of the heater cover 4 allow the heat equalizing plate 2 to move in the cell stacking direction, it is possible to slidingly insert the heat equalizing plate 2 into the heater cover 4 and also to absorb thermal expansion of the heat equalizing plate 2.

Further, the heater cover 4 and the heat equalizing plate 2 are positioned by the first rivet 6, and the metal stay 5 and the heater cover 4 are positioned by the second rivet 7. Therefore, it is possible to restrict relative positions of the three members by the two rivets 6, 7.

Further, since the first rivet 6 and the second rivet 7 are disposed substantially at the middle portion of the battery module 101 in the cell stacking direction, it is possible to restrict the relative positions of the three members at a location where even if the battery module 101 is expanded, an influence thereof on the metal stay 5 is smallest.

Further, since the heater cover 4 is provided with the tying band insertion holes 49A, 49B through which the tying bands 9 is inserted, it is possible to properly arrange the harness 8 of the heater 3.

In addition, since the tying band insertion holes 49A, 49B are provided on each of both end portions of the heater cover 4 in the cell stacking direction, it is possible to draw out the harness 8 of the heater 3 from either side of the heater module 1, thereby enhancing a degree of freedom of layout of the harness 8.

Meanwhile, the present invention is not limited to the foregoing embodiments, but may be appropriately changed or modified.

The invention claimed is:

1. A heater module which is configured to be arranged on a side surface of a battery module, the battery module being constructed by stacking a plurality of cells, and which comprises:
   a heat equalizing plate;
   a heater;
   a heater cover, which is different from the heat equalizing plate and the heater; and
   a metal stay made of a metal,
   the heat equalizing plate, the heater, the heater cover, and the metal stay being arranged in this order from the side surface of the battery module,
   wherein the heater is fixed on the heat equalizing plate,
   wherein the heater cover includes a heat equalizing plate holding portion for holding the heat equalizing plate and a stay holding portion for holding the metal stay,
   wherein the metal stay includes: fastening portions provided on both end portions thereof in a stacking direction of the cells and configured to be fastened to the side surface of the battery module; and a bent portion configured to cover a lower surface of the heater cover, and
   wherein the bent portion of the metal stay is arranged at a location overlapping with the heat equalizing plate holding portion of the heater cover in the stacking direction.

2. The heater module according to claim 1,
   wherein the metal stay is configured so that the fastening portions are respectively connected to a stay main body via crank portions.

3. The heater module according to claim 1,
   wherein the heater cover includes an abutting portion configured to abut against the side surface of the battery module so that an air layer is formed between the heat equalizing plate and the side surface, and
   wherein a plurality of the abutting portions are formed in the stacking direction.

4. The heater module according to claim 1,
wherein the heat equalizing plate holding portion of the heater cover allows the heat equalizing plate to move in the stacking direction.

5. The heater module according to claim 1,
wherein the heater cover and the heat equalizing plate are positioned by a first rivet, and
wherein the metal stay and the heater cover are positioned by a second rivet.

6. The heater module according to claim 5,
wherein the first rivet and the second rivet are disposed substantially at a middle portion of the battery module in the stacking direction.

7. The heater module according to claim 1,
wherein the heater cover has a through-hole through which a tying band is inserted.

8. The heater module according to claim 7,
wherein the through-hole is provided on each of both end portions of the heater cover in the stacking direction.

* * * * *